US006361847B1

(12) United States Patent
Magnusson et al.

(10) Patent No.: US 6,361,847 B1
(45) Date of Patent: Mar. 26, 2002

(54) PRINTING INK-DECORATED PACKAGING MATERIAL FOR ASEPTIC PACKAGES, AND A METHOD OF PRODUCING THE SAME

(75) Inventors: Tommy Magnusson, Södra Sandby; Rolf Malmgren, Landskrona; Ib Leth, Kävlinge; Mikael Berlin, Lund; Mats Bentmar, Svedala, all of (SE)

(73) Assignee: Tetra Laval Holdings & Finance S.A., Pully (CH)

(*) Notice: Subject to any disclaimer, the term of this patent is extended or adjusted under 35 U.S.C. 154(b) by 0 days.

(21) Appl. No.: 09/423,689

(22) PCT Filed: May 12, 1998

(86) PCT No.: PCT/SE98/00871

§ 371 Date: Nov. 12, 1999

§ 102(e) Date: Nov. 12, 1999

(87) PCT Pub. No.: WO98/51493

PCT Pub. Date: Nov. 19, 1998

(30) Foreign Application Priority Data

May 14, 1997 (SE) .............................................. 9701789

(51) Int. Cl.[7] .................................................. B32B 1/04

(52) U.S. Cl. ...................... 428/68; 156/244.16; 283/81; 427/208.4; 428/76; 428/201; 428/203; 428/204; 428/511

(58) Field of Search ............................ 428/68, 76, 201, 428/203, 204, 511; 283/81; 156/244.16; 427/208.4

(56) References Cited

U.S. PATENT DOCUMENTS

| | | | | |
|---|---|---|---|---|
| 4,060,657 A | | 11/1977 | Iwami et al. | 428/375 |
| 4,281,040 A | | 7/1981 | Santiago | 428/195 |
| 5,066,543 A | | 11/1991 | Hwo | 428/412 |
| 5,126,198 A | | 6/1992 | Schinkel et al. | 428/349 |
| 5,169,728 A | | 12/1992 | Murphy et al. | 428/516 |
| 5,188,867 A | | 2/1993 | Chu et al. | 427/173 |
| 5,419,795 A | | 5/1995 | Wood et al. | 156/184 |
| 5,419,960 A | | 5/1995 | Touhsaent | 428/331 |
| 5,540,885 A | | 7/1996 | Pahlmark et al. | 422/28 |
| 5,725,935 A | * | 3/1998 | Rajan | 428/195 |
| 6,127,023 A | * | 10/2000 | Marbler | 428/200 |

FOREIGN PATENT DOCUMENTS

| | | | |
|---|---|---|---|
| GB | 1048367 | * | 11/1966 |
| WO | WO94/01143 | | 1/1994 |
| WO | WO94/25270 | | 11/1994 |
| WO | WO96/23659 | | 8/1996 |
| WO | WO98/51493 | | 11/1998 |

* cited by examiner

*Primary Examiner*—Nasser Ahmad
(74) *Attorney, Agent, or Firm*—Burns, Doane, Swecker & Mathis, L.L.P.

(57) ABSTRACT

The disclosure relates to printing ink-decorated packaging laminate for aseptic packages of the type which is produced in that a web of paper which has an outer coating of plastic is, for the purpose of sterilization, led through a bath of hydrogen peroxide prior to the reforming of the web into aseptic packages. The packaging laminate has a décor of water-based printing ink which is applied in the desired pattern on the outside of the outer plastic coating. For the purpose of protecting the water-based printing ink décor against attack from hydrogen peroxide in connection with the sterilization process, the packaging laminate is provided with an outer layer of water-based polyethylene or water-based acid-modified polyethylene which, by means of so-called dispersion coating, is applied on the printing ink-decorated outer plastic coating after, or in connection with the application of said printing ink décor.

10 Claims, 2 Drawing Sheets

Figure 1:
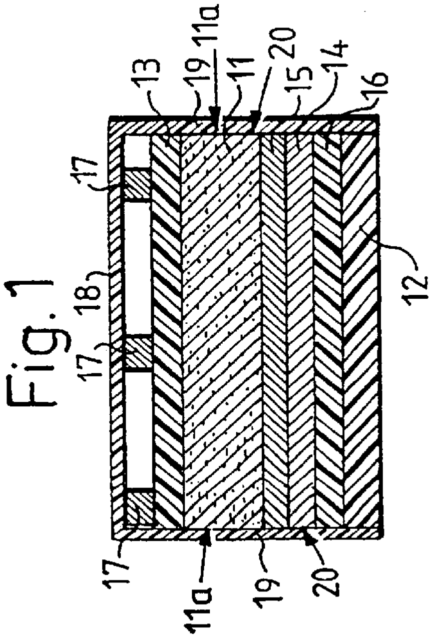

PRINTING INK-DECORATED PACKAGING MATERIAL FOR ASEPTIC PACKAGES, AND A METHOD OF PRODUCING THE SAME

TECHNICAL FIELD

The present invention relates to a printing ink-decorated packaging material of laminate type for aseptic packages according to the preamble to independent Claim 1. The present invention also relates to a method of producing the printing ink-decorated packaging material according to the preamble to independent Claim 7.

BACKGROUND ART

Within the packaging industry, use is often made of dimensionally stable, liquid-tight packages of a single use disposable nature for packing and transporting liquid foods under aseptic conditions so that the packed food, without the risk of bacteriological or other attack, may be stored for lengthy storage times (so-called extended shelf-life) in the unopened package with retained pristine quality and freshness. A large group of so-called aseptic single use disposable packages is produced from a packaging material of laminate type comprising a core layer of paper or paperboard and outer, liquid-tight coatings of plastic, normally polyethylene, on both sides of the core layer.

In order to impart to the aseptic package additional tightness properties, for example tightness properties vis-á-vis light, oxygen gas etc., the packaging material is provided with at least one additional so-called barrier layer between the core layer and one of the two outer, liquid-tight plastic coatings which is intended to face inwards when the packaging material is reformed into packages.

Such a barrier layer may consist of a polymer, for example polyamide, although the barrier layer most generally consists of a foil of aluminium (Alifoil) which, apart from superior oxygen gas and light barrier properties, also possesses the advantage that it makes for mechanically strong and bacteriologically tight sealing joints by means of rapid inductive thermosealing technique, as a person skilled in the art will be aware.

Conventionally, aseptic packaging material of the type described above is produced in that a web of paper or paperboard is coated with outer, liquid-tight plastic coatings, normally polyethylene, which are extruded on both sides of the web. The plastic-coated web is thereafter provided with an aluminium foil which serves as oxygen gas and light barrier and which is brought together with and bonded to the outer plastic coating on one side of the web by means of an adhesive applied between the web and the aluminium foil. The web is then coated with one or more additional layers of plastic, normally polyethylene, which are extruded on the foil-clad side of the web for the formation of one of the two outer liquid-tight coatings of plastic described by way of introduction, i.e. that coating which is to face inwards when the packaging material is reformed into packages. The other of the two above-mentioned outer plastic coatings is normally provided with decorative artwork (hereinafter referred to as décor) of printing ink, preferably water-based printing ink, which is applied on the outside of the plastic coating in the desired pattern by means of conventional printing techniques.

From the above-described packaging material, aseptic packages are produced in that both the packaging material and the relevant contents are sterilized prior to the filling operation, whereafter the filling phase is carried out under sterile (aseptic) filling atmosphere in order to avoid reinfection of the sterilized contents.

Nowadays, the production of packages most generally takes place using modern, high-speed packing and filling machines of the type which, either from a web or from prefabricated sheet blanks of the packaging material, form, fill and seal the packages.

From, for example a web, aseptic packages are produced in that the web for the purpose of sterilization, is led down into and through a bath of aqueous hydrogen peroxide solution, whereafter the web is dried and reformed into a tube by both longitudinal edges of the web being united with one another in an overlap joint seal. The tube is filled with the relevant sterilized contents, for example liquid food, and is divided into closed, filled packages by repeated transverse seals below the level of the contents in the tube. The packages are separated from one another by incisions or cuts in the transverse sealing zones and are given the desired geometric, normally parallelepipedic configuration, by a further forming and sealing operation for the formation of the finished, aseptic packages.

Printing inks for the described application are most often water-based and therefore require that the surface on which they are to be applied (in this case the one outer plastic coating of the packaging material) is sufficiently hydrophilic to achieve good adhesion between the printing ink and the printing surface.

A surface of polyethylene, which is used as the décor-carrying plastic surface in the above described prior art packaging material is, however, hydrophobic (water repellent) and must therefore be modified in order to make for the desired good adhesion. For the purpose of promoting adhesion, the packaging material is therefore subjected to a surface treatment modifying its polarity which is normally based on the concept that the plastic surface in question is treated with electric corona discharges (so-called corona treating), whereby the plastic surface is given the desired hydrophilic character prior to the application of the water-based printing ink décor.

One serious problem inherent in the prior art printing ink decorated packaging material is that at least certain of the printing ink components present in the water-based printing ink tend to interact with hydrogen peroxide when the printing ink-decorated packaging material is led down into and through the hydrogen peroxide bath, as described above. Such an interaction not only leads to the printing ink décor of the packaging material being destroyed ("fading"), but also results in excessively high consumption of hydrogen peroxide because of the undesired interaction.

OBJECTS OF THE INVENTION

One object of the present invention is therefore to obviate the above-outlined drawback in the prior art technique.

A further object of the present invention is to realise a printing ink-decorated packaging material for aseptic packages which is well-adapted for sterilization by means of aqueous hydrogen peroxide solution, without the risk of interaction between the printing ink and the hydrogen peroxide leading to a deterioration in quality, and without excessive consumption of hydrogen peroxide.

Yet a further object of the present invention is to realise a printing ink-decorated packaging material for aseptic packages which is susceptible to sterilization using aqueous hydrogen peroxide solution with retained pristine printing ink quality and with but minimum consumption of hydrogen peroxide as compared with the prior art printing ink-decorated packaging material.

Still a further object of the present invention is to produce a printing ink-decorated packaging material for aseptic packages, the packaging material displaying, in addition to good printing properties, particularly good liquid tightness properties.

Solution

These and other objects are attained according to the present invention in that a packaging material of the type described by way of introduction has been given the characterizing features as set forth in appended Claim 1. Advantageous embodiments of the packaging material according to the present invention have further been given the characterizing features as set forth in the appended subclaims.

OUTLINE OF THE INVENTION

One explanation for the above described interaction problem, and the intimately related excessive consumption of hydrogen peroxide, may be that the surface treatment carried out for the purpose of promoting adhesion by means of electric corona discharges (corona treating) is so powerful that it not only generates the intended surface modification of the outer plastic coating of the packaging material (printing surface), but is even so powerful that the outer plastic coating is "broken up" because of the electric discharges. Such "broken up" regions of the plastic coating have such surface polarity (hydrophilic) that they tend to excessively absorb and retain hydrogen peroxide when the packaging material is brought into contact with the aqueous hydrogen peroxide solution in connection with the reforming of the packaging material into aseptic packages, as described above.

This problem is solved elegantly and effectively according to the present invention in that the printing ink-decorated packaging material is provided with a protective layer of a water-based dispersion of polyethylene or acid-modified polyethylene applied on the décor-carrying outer plastic coating of the packaging material.

A protective layer of water-based polyethylene or acid-modified polyethylene gives the printing ink-decorated outer plastic coating an effective protection against printing ink/hydrogen peroxide interaction, at the same time as it effectively protects such "broken up" regions of the corona-treated plastic coating against contact with aqueous hydrogen peroxide solution in connection with the sterilization of the packaging material, whereby consumption of hydrogen peroxide is drastically reduced.

Examples of usable acid-modified polyethylene dispersions for the protective layer in the packaging material according to the present invention are ethyl acrylic acid copolymer (EAA) and ethyl methacrylic acid copolymer (EMA), preferably ethyl acrylic acid copolymer (EAA).

In another aspect of the present invention, a method is realised of producing the printing ink-decorated packaging material according to the present invention, which is characterized in that the outer plastic coating serving as the décor carrier is coated with an aqueous dispersion of polyethylene or acid-modified polyethylene by so-called dispersion coating.

Dispersion coating, which is a known coating method, may be integrated with the printing phase and thus makes for a rational production and distribution of printing ink-decorated packaging material, even if the printing ink-decorated packaging material is to be produced in very small series for extremely limited markets.

More precisely, the packaging material production may be carried out in two main stages at separate worksites of which the first or central stage is based on producing a prefabricated material, i.e. a non-decorated but otherwise complete packaging material, in normal industrial production volumes in a central, separate production plant, and from the central plant shipping out such prefabricated material to smaller, local production plants where the non-decorated semi-manufactured packaging material is provided with the desired local décor and coated with its protective layer by dispersion coating.

BRIEF DESCRIPTION OF THE ACCOMPANYING DRAWINGS

Figure 2A:
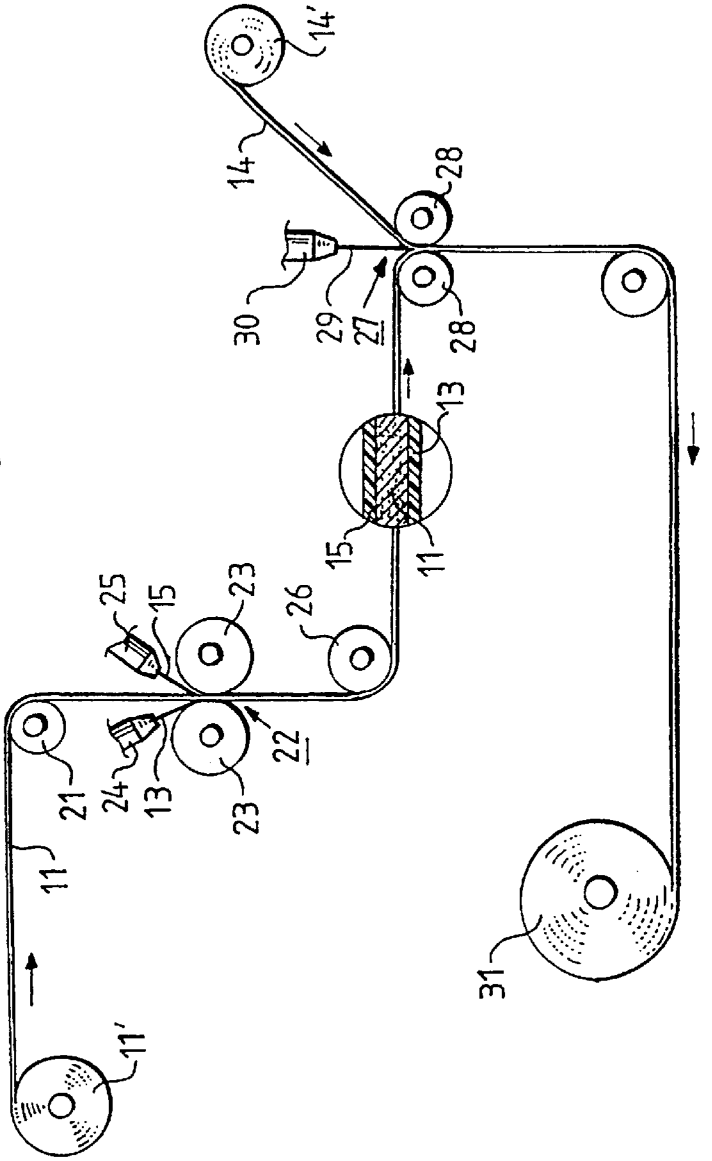
Figure 2B:
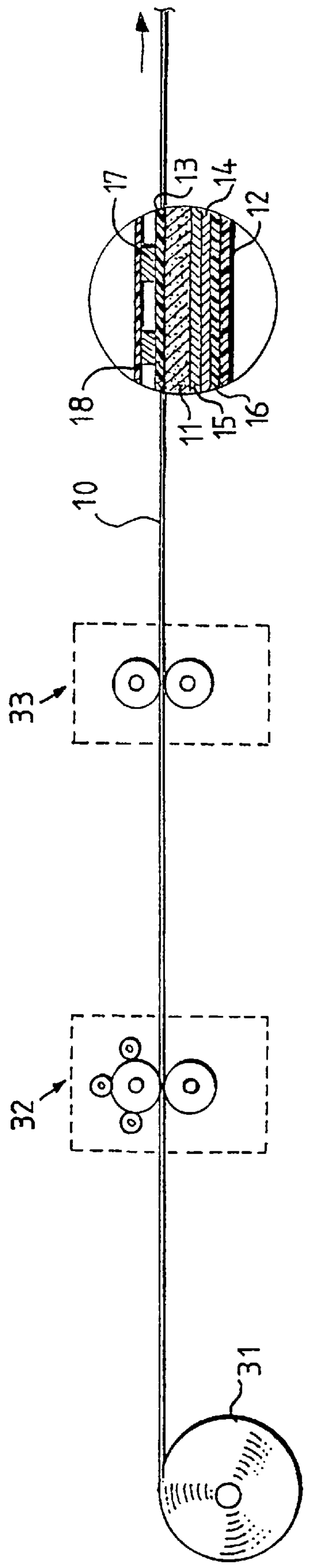

Further advantageous characterizing features of both the packaging material and the manner of its manufacture according to the present invention will be apparent from the following description, with reference to the accompanying Drawings, in which:

FIG. 1 schematically shows a cross section of a printing ink-decorated packaging material according to the invention; and FIGS. 2A and 2B together schematically illustrate the manner of manufacture of the packaging material illustrated in FIG. 1.

DESCRIPTION OF PREFERRED EMBODIMENT

FIG. 1 thus schematically shows a cross section of a packaging material according to the invention for so-called aseptic packages of per se known type. The packaging material, carrying the generic reference numeral 10, comprises a core layer 11 of rigid, but foldable paper of suitable packaging quality for dimensionally stable packages of a single use disposable nature, and outer, liquid-tight coatings 12 and 13 of plastic, preferably polyethylene, on both sides of the core layer 11.

Between the core layer 11 and one of the two outer plastic coatings 12, the packaging material 10 has a foil 14 of aluminium which serves as the light and oxygen gas barrier and which, with good adhesion, is bonded to the core layer 11 by means of an interjacent layer 15 of suitable adhesive.

As is apparent from FIG. 1, the packaging material 10 also has a layer 16 of sealing plastic, preferably polyethylene, applied between the aluminium foil 14 and the outer plastic coating 12 in order to achieve good adhesion between the aluminium foil 14 and the outer plastic coating 12 which, on reforming of the packaging material 10 into aseptic packages, is to face inwards in the package.

The other, outer plastic coating 13 of the packaging material 10 which is also preferably of polyethylene is the carrier of décor 17 of water-based printing ink as described above, which is applied on the outside of the plastic coating 13 using conventional printing techniques.

The layer 17 of printing ink (the décor) is covered by a protective transparent layer 18 of water-based polyethylene or acid-modified polyethylene, preferably ethyl acrylic acid copolymer (EAA), which, by means of so-called dispersion coating, is applied on the décor layer 17 for protecting the subjacent printing ink on contact of the packaging material 10 with aqueous hydrogen peroxide solution in connection with the reforming of the packaging material 10 into aseptic packages as described above.

It will further be apparent from FIG. 1 that the packaging material 10, according to a particularly preferred embodiment of the present invention, is also edge-covered with a thin layer 19 for protecting the otherwise freely exposed incision edge 20 of the packaging material, in particular the cut incision surface 11*a* of the "imbibing" fibre layer 11 of the packaging material 10. As a result of the thus applied edge-covering layer 19, there will be attained according to the invention a practically entirely liquid-tight packaging material which neither requires extra strips or other complicated modification, for example slicing or edge folding, of the packaging material in order to protect the otherwise permanently exposed fibre edge in the longitudinal overlap joint on the inside of the package, as a person skilled in the art will be aware. The edge-covering layer 19 also contributes in preventing edge imbibing when the packaging material 10 is led down into and through the aqueous hydrogen peroxide solution in connection with the reforming of the packaging material 10 into aseptic packages, whereby the risk of accompanying hydrogen peroxide residues is minimised or totally eliminated.

The edge-covering 19 may consist of the same material and be applied simultaneously with the décor-protective covering layer 18 after and/or in connection with the decoration of the packaging material 10 with printing ink.

Preferred materials for the edge-covering layer 19 are thus a waterbased dispersion of polyethylene or a water-based dispersion of an acid-modified polyethylene, e.g. ethyl acrylic acid copolymer (EAA) and ethyl methacrylic acid copolymer (EMA) which is preferably also applied by dispersion coating in the same stage and with the same equipment as the décor-protective coating layer 18.

The packaging material 10 in FIG. 1 is produced according to the invention by the method which is schematically illustrated in FIGS. 2A and 2B. In order to facilitate a comparison of the figures, the same reference numerals as in FIG. 1 have been employed for identical or similar packaging material parts and details in FIGS. 2A and 2B.

As was pointed out earlier, the method according to the present invention may be divided into two main stages, of which the first or central production stage is shown in FIG. 2A and the second or local production stage is shown in FIG. 2B. In order to avoid misunderstanding, it should however be pointed out that the production stage which is shown in FIG. 2A is conventional while the production stage in FIG. 2B involves characterizing features according to the present invention, and that both of the production stages together make for a rational production and distribution of specifically decorated packaging materials for extremely limited markets, even if the printing ink-decorated packaging material is to be produced in very small production volumes.

A web 11 of rigid, but foldable paper is unwound from a magazine reel 11' (to the left in FIG. 2A) and is led via a bending roller 21 through a nip 22 between a pair of cooled press rollers 23, 23 at the same time as both sides of the web 11 are coated with outer coatings 13 and 15 of plastic, preferably polyethylene, which are extruded on both sides of the web by means of extruders 24 and 25, respectively, disposed in connection with the roller nip 22. The plastic-coated web is led via a further bending roller 26 through a nip at 27 between a pair of cooled rollers 28, 28, at the same time as the web is united with an aluminium foil 14 unwound from a magazine reel 14', the aluminium foil being permanently united with the web by means of a layer 29 of suitable adhesive which is extruded between the two webs by means of an extruder 30 disposed in connection with the nip. Thereafter, the web is coated with a first and second outer layer of plastic 16 and 12, respectively, which are extruded on the foil-clad side of the web by means of extruders (not shown) in a per se known manner.

The thus produced packaging material is thereafter wound up on a magazine reel 31 for further transport to a local production plant where the prefabricated packaging material is provided with décor of printing ink and is coated with an outer décor-protecting layer in accordance with the present invention.

At the local production unit, which may be integrated in a line for packaging production, a web of the prefabricated packaging material is unwound from a magazine reel 31 (to the left in FIG. 2B) and is led through a conventional printing station at 32 in which the packaging material is provided with its desired décor of water-based printing ink which, using conventional printing techniques, is applied on the outside of the outer plastic coating 13 of the packaging material in the desired pattern. From the printing station, the thus printing ink-decorated web is led to a coating station at 33 in which the printing ink décor (and preferably also the exposed incision edges) of the packaging material are covered with a layer of a waterbased dispersion of polyethylene or a water-based dispersion of acid-modified polyethylene which, by means of dispersion coating, is applied in a blanket layer over the printing ink décor as well as the packaging material edges for the formation of the finished packaging material 10 according to the invention.

It will thus be apparent from the foregoing description that the previously enumerated objects of the present invention are effectively attained by the printing ink-decorated packaging material and its manner of manufacture, respectively, according to the invention. In particular, the present invention specifically realises a printing ink-decorated packaging material which, unlike similar prior art packaging materials, may be employed with practically any known printing ink whatever, without the risk that the décor—well protected by the outer covering layer—is destroyed in connection with the packaging material being, for the purpose of sterilization, led down into and through an aqueous hydrogen peroxide bath. A particularly advantageous printing ink-decorated packaging material will further be realised if, in the method according to the present invention, the exposed fibre incision edges of the packaging material are also covered by a covering layer applied by dispersion coating, whereby the packaging material becomes particularly liquid-tight and the risk of excessive hydrogen peroxide consumption because of so-called edge imbibing may be eliminated.

It will be obvious to a person skilled in the art that many modifications in respect of the above packaging material details, disclosed merely by way of example, are possible without departing from the inventive concept. Such modifications and alterations thus lie within the spirit and scope of the inventive as this is defined in the appended Claims.

What is claimed is:

1. A printing ink-decorated packaging material of laminate and utilized in aseptic packages, the packaging material comprising a core layer of rigid, but foldable paper and outer, liquid-tight coatings of plastic, of which the one displays décor of printing ink which, using conventional printing techniques, is applied on the outside of the plastic coating in the desired pattern, wherein the printing ink décor applied on the outside of the outer plastic coating is covered by a water-based protective layer applied on the outer plastic coating of a material which is selected from the group essentially comprising polyethylene and acid-modified polyethylene, and an edge-covering layer to prevent edge imbibing of said packaging material of laminate, wherein said packaging material is tailored for sterilization.

2. The packaging material as claimed in claim 1, wherein the protective layer consists of an ethyl acrylic acid or ethyl methacrylic acid copolymer.

3. The packaging material as claimed in claim 1, wherein the free incision edges of the packaging material are also covered by a protective layer of a material selected from the group essentially comprising polyethylene and acid-modified polyethylene.

4. The packaging material as claimed in claim 3, wherein the edge-covering protective layer consists of an ethyl acrylic acid or ethyl methacrylic acid copolymer.

5. The packaging material as claimed in claim 3, wherein the edge-covering protective layer is provided in one continuous piece with the décor covering protective layer.

6. A method of producing a printing ink-decorated packaging material of laminate adapted for sterilization and utilized in aseptic packages as claimed in claim 1, in which method a web of rigid, but foldable paper is coated with plastic which is extruded on the web for the formation of outer, liquid-tight coatings on both sides of the web, whereafter the one of the two outer plastic coatings is provided with décor of printing ink which, using conventional printing techniques, is applied on the outside of said one plastic coating in the desired pattern, wherein the applied printing ink décor is covered with a water-based protective layer of a dispersion of polyethylene or a dispersion of an acid-modified polyethylene which is applied on the outside of the printing ink-decorated outer plastic coating by means of so-called dispersion coating technique, and providing an edge-covering layer to prevent edge imbibing of said packaging material of said laminate.

7. The method as claimed in claim 6, wherein the dispersion of acid-modified polyethylene is selected from the group essentially comprising ethyl acrylic acid and ethyl methacrylic acid modified polyethylene.

8. The method as claimed in claim 6, wherein the longitudinal free incision edges of the packaging material are also covered with a layer of polyethylene or acid-modified polyethylene.

9. The method as claimed in claim 8, wherein the longitudinal free incision edges of the packaging material are covered with a layer of ethyl acrylic acid or ethyl methacrylic acid modified polyethylene.

10. The method as claimed in claim 8, wherein the longitudinal free incision edges of the packaging material are covered in the same operation as the printing ink décor of the packaging material.

* * * * *